May 2, 1933.  L. L. AYDT  1,906,896
MOTOR VEHICLE TRANSMISSION
Filed May 2, 1931   2 Sheets-Sheet 1

L. L. Aydt  Inventor

By C. A. Snow & Co.
Attorneys.

May 2, 1933.  L. L. AYDT  1,906,896
MOTOR VEHICLE TRANSMISSION
Filed May 2, 1931   2 Sheets-Sheet 2
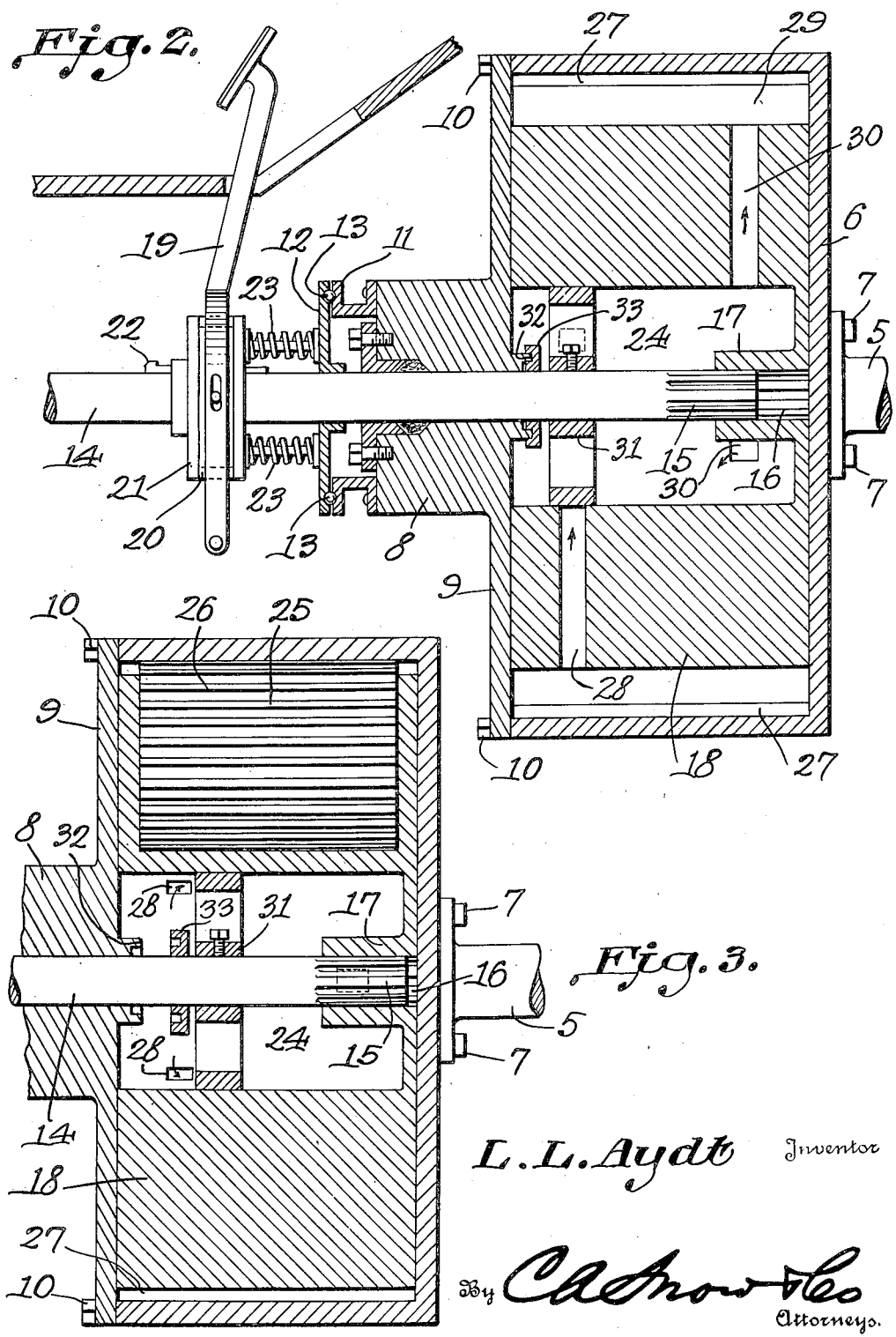

Patented May 2, 1933

1,906,896

UNITED STATES PATENT OFFICE

LAURENCE L. AYDT, OF DAHLGREEN, ILLINOIS

MOTOR VEHICLE TRANSMISSION

Application filed May 2, 1931. Serial No. 534,678.

This invention relates to fluid transmissions designed for use in connection with motor vehicles, the primary object of the invention being to provide means for transmitting the movement of a drive shaft to a driven shaft to produce variable speeds of the driven shaft.

An important object of the invention is to provide a device of this character including a rotary member and a normally stationary member, the rotary member and stationary member being so constructed that a liquid such as oil may be passed therebetween, and held in such a way as to lock the rotary member to the normally stationary member, means being provided to allow a certain amount of slippage between the rotary member and stationary member, to vary the speed of the driven shaft.

A still further object of the invention is to provide means for mounting the housing of the transmission, to the driven shaft, to produce a direct drive when the vehicle is operating in high speed.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view taken on line 2—2 of Figure 1.

Figure 3 is a sectional view taken on line 3—3 of Figure 1.

Figure 1:
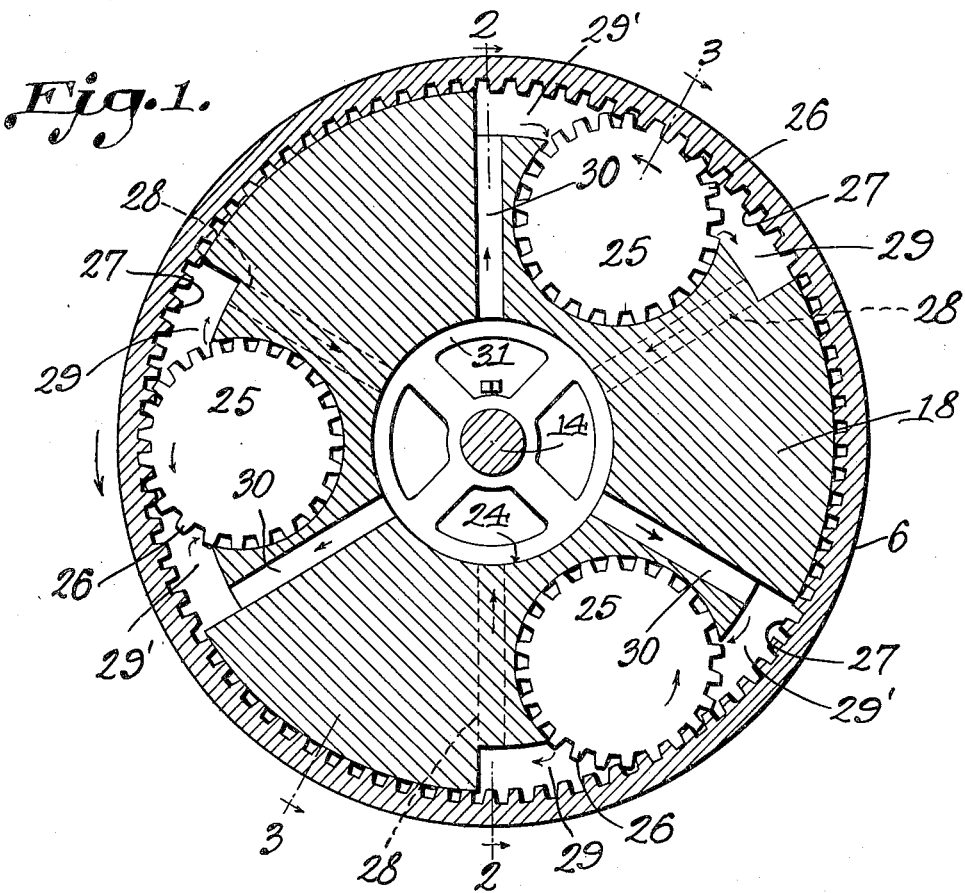
Figure 1 is a vertical sectional view through a transmission constructed in accordance with the invention.
Figure 4:
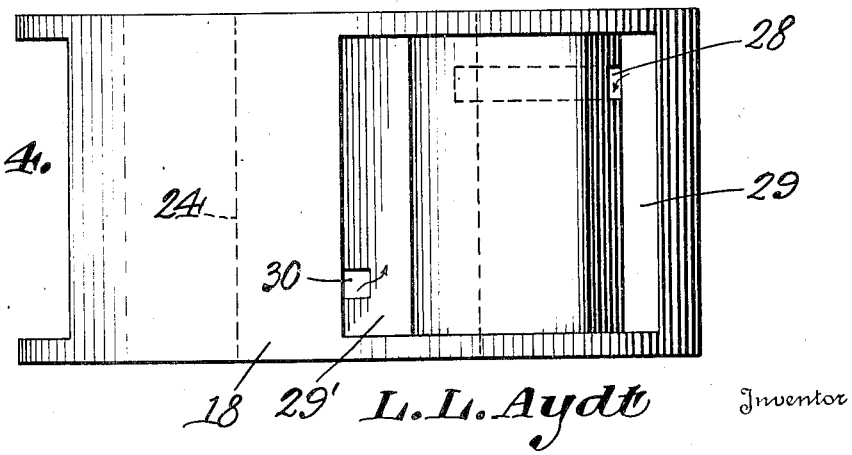
Figure 4 is a plan view of the inner rotary member of the transmission.

Referring to the drawings in detail, the drive shaft of the vehicle is indicated by the reference character 5, and as shown, is bolted to the transmission housing 6, by means of the bolts 7. The transmission housing is substantially wide, as shown by Figure 1 of the drawings, and includes a bearing 8 extending from the cover 9 of the transmission housing, the cover being bolted to the housing, by means of bolts 10.

A thrust bearing indicated by the reference character 11, is disposed at one end of the bearing 8, and embodies a disk 12 and balls 13.

Extending into the transmission housing is a driven shaft 14 which is provided with elongated teeth 15 that mesh with elongated teeth 16 of the socket 17 that extends inwardly from the inner rotary member 18. Thus it will be seen that due to the construction of the teeth 15 and 16, the shaft 14 may be moved longitudinally, for purposes to be hereinafter more fully described.

The reference character 19 designates the operating pedal which is pivotally supported in any suitable manner, the operating pedal being connected with the collar 20 that moves in a peripheral groove formed in the disk 21 that is keyed to the driven shaft 14 by means of the key 22.

Springs 23 are disposed between the thrust bearing and disk 21, so that the operating pedal and driven shaft are normally urged to their active or high speed positions.

The inner rotary member 18 is formed with a central cut out portion extending through substantially the entire width thereof, providing an oil chamber 24 to receive the fluid of the transmission. The inner rotary member is also provided with a plurality of curved cut out portions of diameters to receive the rotary members 25 that are of lengths to extend throughout the entire width of the inner rotary member, the rotary members 25 being provided with teeth 26, that extend throughout the lengths thereof, the teeth cooperating with the internal teeth 27 formed in the transmission housing 6.

These rotary members 25 divide the curved cut out portions of the inner rotary member 18 into suction chambers 29′ and compression chambers 29. The suction chambers 29′ are in communication with the oil chamber 24 through the passageways 30, while the passageways 28 establish communication between the compression chambers and oil chamber 24. It follows that when oil has an unobstructed passage through the passageways 28 and 30, suction chambers 29' and compression chambers 29, the transmission housing will rotate around the inner rotary member, and the driven shaft will remain idle.

Secured to the shaft 14, is a valve member 31 which is adapted to move to a position as shown by Figure 1 of the drawings, where it closes the ports at the inner ends of the passageways 28, holding the fluid within the compression passageways 28, and compression chambers 29, thereby locking the rotary members 25 against movement, and causing the inner rotary member to rotate with the transmission housing 6, and consequently transmitting rotary movement to the driven shaft 14 to operate the vehicle.

A clutch face 32 is provided on the cover 8, and is adapted to be engaged by the clutch member 33 which is secured to the shaft 14, so that a direct drive will be provided between the clutch housing and the driven shaft, to eliminate any possibility of slippage between the drive shaft and driven shaft of the vehicle under direct drive.

It will be obvious that when the operating pedal 19 is moved forwardly, the valve member 31 will be moved away from the passageways 28, uncovering the ports at the inner ends of the passageways 28, to allow the fluid to be pumped through the several passageways and compartment of the inner rotary member, without moving the driven shaft 14.

It might be further stated that openings are provided in the valve member 31 so that the liquid may pass through the valve member 31 in its circulation through the oil chamber 24 and passageways of the inner rotary member.

While the connection between the driven shaft 14 and differential of the vehicle has not been shown, it is to be understood that any suitable sliding connection may be employed.

From the foregoing it will be obvious that due to the construction shown and described, the motor vehicle equipped with a transmission of the character disclosed in this application, may operate at varying speed by regulating the quantity of oil passing through the passageways, suction and compression chambers, which is accomplished by the operation of the valve 31.

When the operating lever 19 is released by the operator, the springs 23 will move the shaft 14 and valve 31 carried thereby, to cause the valve 31 to cover the ports at the inner ends of the passageways 28, locking the rotary members 25 against movement, and causing a direct drive between the drive shaft 5, transmission housing 6, inner rotary member 18, and driven shaft 14.

I claim:

1. A fluid transmission comprising in combination, a drive shaft and a driven shaft, a housing secured to one end of the drive shaft, an inner rotary member mounted on the driven shaft, said inner rotary member having a central oil chamber and peripheral cut out portions, rotary members mounted in the peripheral cut out portions and dividing the peripheral cut out portions into suction chambers, and compression chamber passageways providing communication between the suction chambers and inner oil chamber, passageways providing communication between the compression chambers and inner oil chamber, a circular valve member secured to the driven shaft and adapted to move over the inner ends of the last mentioned passageways to restrict the passage of oil through the last mentioned passageways to lock the drive shaft and driven shaft together.

2. A fluid transmission comprising in combination a drive shaft and a longitudinal movable driven shaft, a housing secured to the drive shaft, an inner rotary member mounted on the driven shaft and disposed within the housing, said rotary member having a fluid chamber and passageways leading from the chamber to allow the liquid in the fluid chamber and passageways to circulate to the periphery of the inner rotary member, means between the housing and rotary member to operatively connect the housing and rotary member, and means movable with the driven shaft for restricting the passage of liquid through the passageways to regulate the speed of rotation of the driven shaft.

3. A fluid transmission comprising in combination, a drive shaft and a longitudinal movable driven shaft, a housing secured to one end of the drive shaft, an inner rotary member mounted on the driven shaft and disposed in the housing, said inner rotary member having a central oil chamber, passageways extending from the oil chamber to the periphery of the inner rotary member, rotary members carried by the inner rotary member and rotated by contact with the housing, said rotary member adapted to pump liquid through the passageways and oil chamber, and a valve member mounted on the driven shaft and movable within the central oil chamber for controlling the passage of liquid through the passageways to regulate the speed of rotation of the driven shaft.

In testimony that I claim the foregoing as my own, I have hereto affixed my signature.

LAURENCE L. AYDT.